US010818434B2

(12) United States Patent
Fellers et al.

(10) Patent No.: US 10,818,434 B2
(45) Date of Patent: Oct. 27, 2020

(54) ADAPTOR FOR A CAPACITOR

(71) Applicant: Eaton Intelligent Power Limited, Dublin (IE)

(72) Inventors: Clay Lynwood Fellers, Little Mountain, SC (US); Brent Andrew Banks, Greenville, SC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/299,695

(22) Filed: Mar. 12, 2019

(65) Prior Publication Data
US 2019/0318873 A1  Oct. 17, 2019

Related U.S. Application Data

(60) Provisional application No. 62/656,031, filed on Apr. 11, 2018.

(51) Int. Cl.
*H05K 7/00* (2006.01)
*H01G 4/224* (2006.01)
(Continued)

(52) U.S. Cl.
CPC .............. *H01G 4/224* (2013.01); *H01B 17/28* (2013.01); *H01H 85/165* (2013.01)

(58) Field of Classification Search
USPC ........................................................ 361/821
See application file for complete search history.

(56) References Cited

U.S. PATENT DOCUMENTS 2,922,927 A   1/1960 Raudabaugh
3,235,778 A   2/1966 Myers et al.
(Continued)

FOREIGN PATENT DOCUMENTS

CN   2241381 Y   11/1996
CN   2935583 Y   8/2007
(Continued)

OTHER PUBLICATIONS

Artur Frias Rebelo, European International Searching Authority, International Search Report and Written Opinion, counterpart PCT Application No. PCT/EP2019/025100 dated Aug. 1, 2019, 17 pages total.

(Continued)

*Primary Examiner* — Hung S. Bui
(74) *Attorney, Agent, or Firm* — DiBerardino McGovern IP Group LLC

(57) ABSTRACT

A system includes a capacitor including: a structure, and one or more capacitive devices at the structure; and an electrically insulating bushing including: a fuse including: a fuse body including a fuse housing, a first fuse end, and a second fuse end, the fuse housing extending from the first fuse end to the second fuse end and defining an interior space, and a fusible element in the interior space, the fusible element electrically connected to the first fuse end and the second fuse end; and an adaptor including: an adaptor body extending from a first adaptor end to a second adaptor end, the adaptor body hermetically sealed to the structure and the second adaptor end configured to receive the first fuse end, and an adaptor connection interface in the adaptor body. The first fuse end is removably connected to the adaptor at the adaptor connection interface.

23 Claims, 8 Drawing Sheets

(51) Int. Cl.
*H01B 17/28* (2006.01)
*H01H 85/165* (2006.01)

(56) References Cited

U.S. PATENT DOCUMENTS

| | | | |
|---|---|---|---|
| 3,962,667 A | 6/1976 | Link | |
| 4,161,712 A | 7/1979 | Thiel | |
| 4,442,473 A | 4/1984 | Holtzman et al. | |
| 9,490,067 B2 * | 11/2016 | Li | H01G 2/103 |
| 9,761,374 B2 | 9/2017 | Li et al. | |
| 10,254,323 B2 | 4/2019 | Berkcan et al. | |
| 2010/0124834 A1 | 5/2010 | De Ghazal et al. | |
| 2017/0059639 A1 | 3/2017 | Hashmi et al. | |

FOREIGN PATENT DOCUMENTS

| | | |
|---|---|---|
| CN | 101379138 B | 3/2019 |
| CN | 109563253 A | 4/2019 |
| DE | 2906479 A1 | 8/1980 |
| EP | 2431982 A1 | 3/2012 |
| GB | 272888 | 9/1927 |
| IN | 310985 B | 4/2019 |
| KR | 20190028668 A | 3/2019 |
| MX | 2018006915 A | 11/2018 |

OTHER PUBLICATIONS

CN2241381 published Nov. 27, 1996, with English language machine translation (three pages) from Patent Translate, available from https://worldwide.espacenet.com/patent/ and downloaded on Apr. 29, 2020 (CN2241381 was previously cited with an English language Abstrat in the Informatin Disclosure Statement of Mar. 12, 2019), 10 pages total.

* cited by examiner

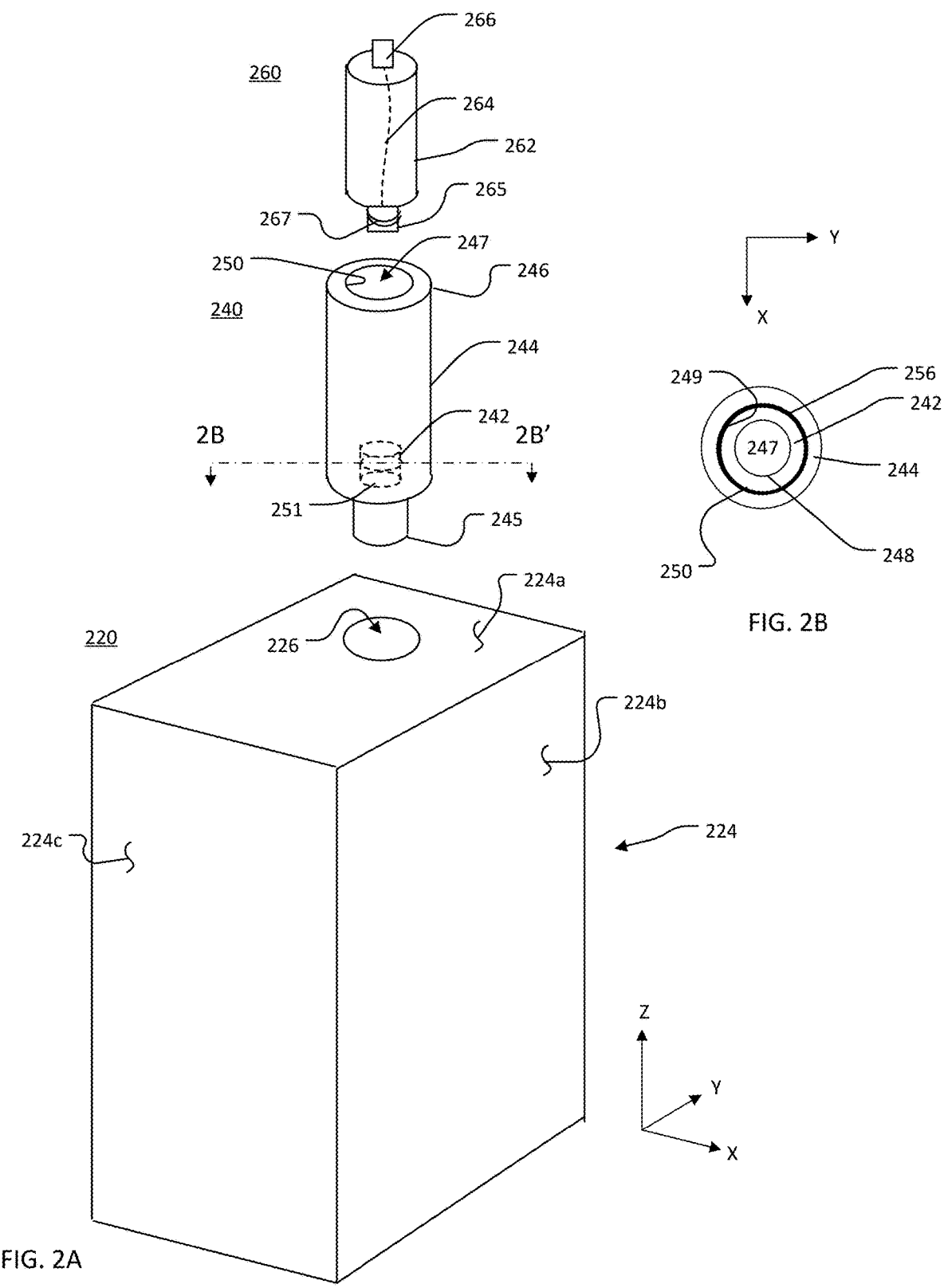

ADAPTOR FOR A CAPACITOR

CROSS-REFERENCE TO RELATED APPLICATION

This application claims the benefit of U.S. Provisional Application No. 62/656,031, filed on Apr. 11, 2018 and titled ADAPTOR FOR A CAPACITOR, which is incorporated herein by reference in its entirety.

TECHNICAL FIELD

This disclosure relates to an adaptor for a capacitor. The adaptor is used to connect an external fuse to the capacitor.

BACKGROUND

A bushing is an insulating body through which an electrical conductor passes. In addition to being made from an electrically insulating material, a bushing is associated with properties such as, for example, a Basic Impulse insulation Level (BIL) (which is the momentary fault voltage that the bushing is able to withstand), a current carrying capacity, an operating voltage, and creepage distance (which is the shortest distance between two conductive points, measured along the insulating surface of the bushing). Insulating bushings are used, for example, with capacitor banks to electrically connect one or more capacitive devices of the capacitor bank to an electrical power system.

SUMMARY

In one general aspect, a system includes a capacitor including: a structure, and one or more capacitive devices at the structure; and an electrically insulating bushing including: a fuse including: a fuse body including a fuse housing, a first fuse end, and a second fuse end, the fuse housing extending from the first fuse end to the second fuse end and defining an interior space, and a fusible element in the interior space, the fusible element electrically connected to the first fuse end and the second fuse end; and an adaptor including: an adaptor body extending from a first adaptor end to a second adaptor end, the adaptor body hermetically sealed to the structure and the second adaptor end configured to receive the first fuse end, and an adaptor connection interface in the adaptor body. The first fuse end is removably connected to the adaptor at the adaptor connection interface.

Implementations may include one or more of the following features. The adaptor connection interface may include a metallic material on an inner surface of the adaptor body, the metallic material on the inner surface of the adaptor body being configured to make physical contact with the first fuse end.

The adaptor connection interface may include metallic adaptor threads on a first side, a second side of the adaptor connection interface may be sealed to an inner surface of the adaptor body, and the first fuse end may include metallic fuse threads that are configured to interlock with the adaptor threads to removably connect the first fuse end to the adaptor connection interface.

The adaptor body may include a ceramic material. The adaptor body may include a polymer material.

The adaptor body may include a plurality of skirts, each skirt extending radially from an exterior surface of the adaptor body.

In some implementations, the system also includes a filler material in the adaptor body, with the filler material and portions of the fuse that are received in the adaptor body substantially filling the adaptor body. The adaptor body also may include one or more ports configured to allow insertion of the filler material.

The structure may be a housing that encloses the one or more capacitive devices.

In another general aspect, a system includes a capacitor device configured to be received at a capacitor device structure; and an adaptor configured to be hermetically sealed to the capacitor device structure, the adaptor including an adaptor body of an insulating material, the adaptor body including a sidewall that extends from the capacitor device structure and defines an interior space, the sidewall including an exterior surface and an interior surface and the adaptor body further includes an electrically conductive adaptor interface in the interior space and adhered to the interior surface. The electrically conductive adaptor interface is configured to connect to a fuse that is external to and separate from the capacitor device structure to mount the fuse to the adaptor and, when the fuse is connected to the electrically conductive adaptor interface, the fuse and the adaptor form an insulating bushing for the capacitor device.

Implementations may include one or more of the following features. The adaptor also may include a filler material, and, in these implementations, when the fuse is connected to the electrically conductive adaptor interface, the interior space is filled with the fuse and the filler material such that no air is in the interior space.

The insulating material may be a polymer.

The electrically conductive adaptor interface may include threads configured to interlock with corresponding threads on an exterior of the fuse.

The electrically conductive adaptor interface may be a metallic material.

In another general aspect, a capacitor includes a structure; a plurality of capacitive devices at the structure; a plurality of electrically insulating bushings extending outward from the structure, each of the plurality of electrically insulating bushings hermetically sealed to the structure, the plurality of electrically insulating bushings including at least a first electrically insulating bushing and a second electrically insulating bushing. The first electrically insulating bushing includes: a single-piece body formed of an electrically insulating material, the single-piece body extending from a first end of the single-piece body to a second end of the single-piece body, the first end of the single-piece body passing through a first opening in the structure and an exterior surface of the single-piece body being hermetically sealed to the structure such that the first opening is hermetically sealed. The second electrically insulating bushing includes: an electrically insulating adaptor body extending from a first end to a second end, the adaptor body including an electrically insulating material and an electrically conductive connection interface, the first end of the adaptor body passing through a second opening in the structure and an exterior surface of the adaptor body being hermetically sealed to the structure such that the second opening is hermetically sealed, and a fuse including a fuse housing and a fusible element in the fuse housing, where the electrically conductive connection interface is configured to hold the fuse to the adaptor body and to electrically connect the fusible element to at least one the plurality of capacitive devices.

Implementations of any of the techniques described herein may include an insulating bushing, an adaptor, a system, an apparatus, or a method. The details of one or more implementations are set forth in the accompanying

DRAWING DESCRIPTION

FIG. 2A is a perspective exploded view of an example of a system that includes a capacitor, an adaptor, and a fuse.

FIG. 2B is a cross-sectional view of the adaptor of FIG. 2A taken along the line 2B-2B' of FIG. 2A.

DETAILED DESCRIPTION

Figure 1A:
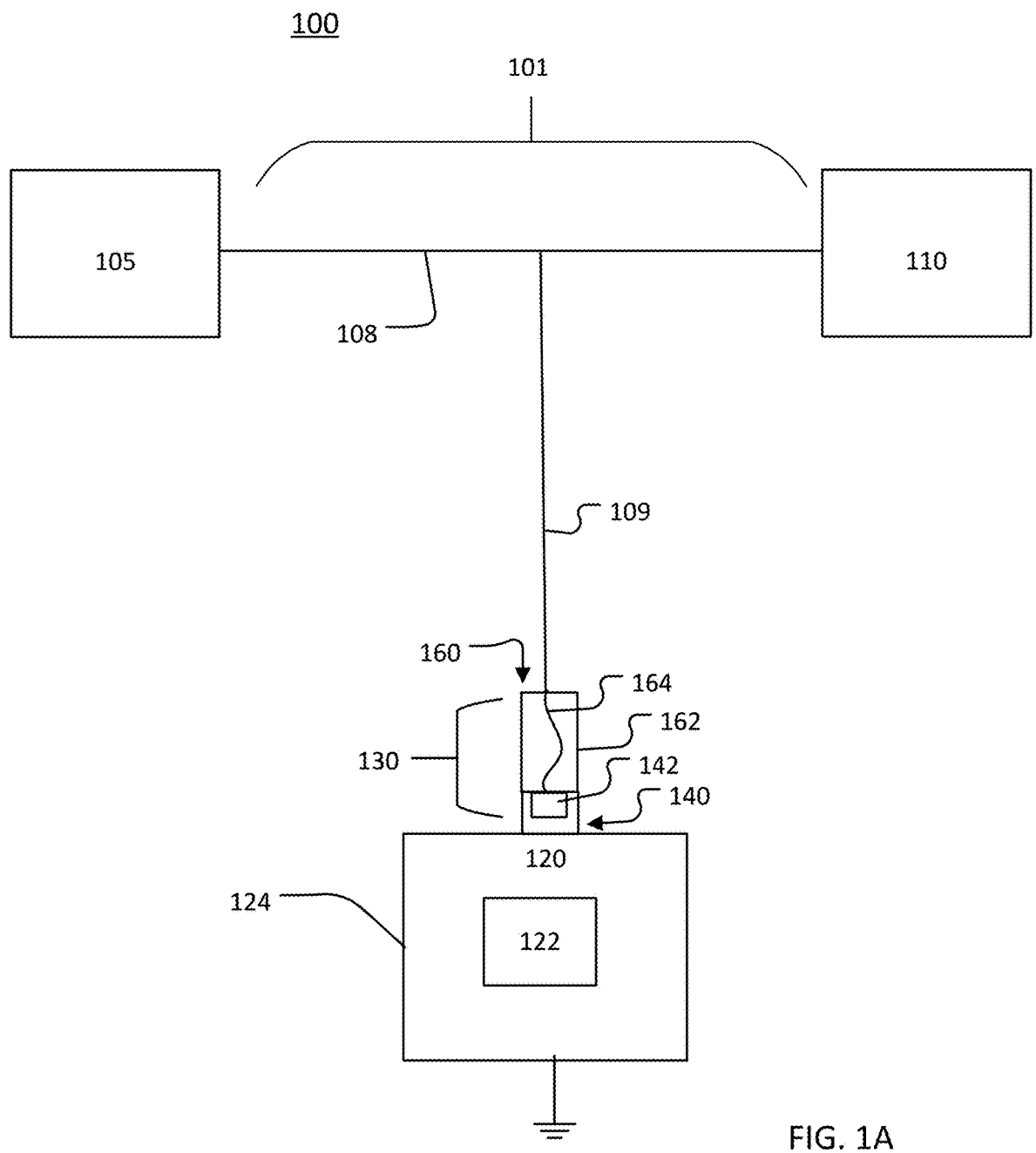
FIG. 1A is a block diagram of an example of an electrical power system.

FIG. 1A is a block diagram of an example of an electrical power system 100. The electrical power system 100 includes an electrical power transmission and distribution network 101 that transfers electricity from a power source 105 to electrical loads 110 through a distribution path 108. The electrical power transmission and distribution network 101 may be, for example, an electrical grid, an electrical system, or a multi-phase electrical network that provides electricity to commercial and/or residential customers. The electrical power transmission and distribution network 101 may have an operating voltage of, for example, at least 1 kilovolt (kV), up to 34.5 kV, up to 38 kV, or 69 kV or higher, and may operate at a fundamental frequency of, for example, 50-60 Hertz (Hz). The distribution path 108 may include, for example, one or more transmission lines, distribution lines, electrical cables, and/or any other mechanism for transmitting electricity.

The power system 100 includes a capacitor 120 that is connected to the transmission and distribution network 101 through a fuse bus 109. The capacitor 120 includes one or more capacitive devices 122 installed in or on a structure 124. The structure 124 may be, for example, a housing, an open-air rack, or a substation bank. The capacitive devices 122 may be any electrical component that stores an electrical charge, such as a capacitor formed from two electrically conductive plates separated by an insulating dielectric. In some implementations, the capacitor 120 is an externally fused capacitor bank, such as the capacitor bank 120B of FIG. 1B. When connected to the power system 100, the capacitor 120 improves the performance of the power system 100 by, for example, increasing the power factor. The power factor is a ratio of real power (delivered to the load, measured in watts) to apparent power (measured in volt-amperes). The power factor provides an indication of how efficiently electricity is being used within the power system 100.

The fuse bus 109 is electrically connected to the capacitor 120 through an electrically insulating bushing 130. The electrically insulating bushing 130 includes an adaptor 140, which is sealed to the structure 124, and a fuse 160, which is connected to the adaptor 140 at an adaptor connection interface 142. As discussed further below, the adaptor 140 and the fuse 160 provide a compact insulating bushing 130 that also isolates a failed capacitor from the electrical power system 100. Furthermore, the fuse is removably attached to the adaptor 140, thus allowing the fuse 160 to be replaced if the fuse 160 opens or operates on an un-failed capacitor.

The fuse 160 isolates a failed capacitor from the electrical system before available fault current can cause rupture of the capacitor 120. The fuse 160 may be a current-limiting fuse. The fuse 160 includes an electrically insulating bushing 162 and a fusible element 164 inside an interior space defined by the electrically insulating bushing 162. The fuse 160 is mechanically and electrically connected to the adaptor 140 at the adaptor connection interface 142, which is mechanically connected to the structure 124 such that the adaptor 140 provides electrical insulation between the fuse 160 and the structure 124.

The fuse 160 is associated with a maximum current rating and a maximum voltage rating. In the presence of a current that exceeds the maximum rated current (such as a high current produced by a fault of the capacitor), the fuse 160 operates (for example, the fusible element 164 melts) to isolate the capacitor 120 from the fuse bus 109, thereby preventing electricity from reaching the capacitor 120. The maximum voltage and current ratings of the fuse 160 may be, for example, 23 kiloVolts (kV) at up to 140 Amperes (A).

The adaptor 140 and the fuse 160 provide a compact system for protecting the capacitor 120. For example, in a traditional system that includes an externally fused capacitor, a fuse (such as the fuse 160) is connected to an external terminal of an insulating bushing. In these traditional systems, the fuse does not form part of the insulating bushing. In contrast, the adaptor 140 enables the fuse 160 to provide the functionality of a fuse (current interruption) while also allowing the fuse 160 to provide the functionality associated with an insulating bushing (for example, BIL and creepage distance). Thus, despite also including the fuse 160, the space required by the insulating bushing 130 may be less than or approximately equal to the space required by a traditional insulating bushing that connects to an external fuse. The reduction in required space allows the capacitor 120 to be used in a smaller space, enables more efficient use of space, and provides a more cost-effective installation. Moreover, the adaptor connection interface 142 allows the fuse 160 to be connected and disconnected without disturbing the seal between the adaptor 140 and the structure 124. Thus, if the fuse 160 operates but the adaptor 140 and the capacitor 120 remain sound, the fuse 160 may be replaced and the capacitor 120 returned to service.

Figure 1B:
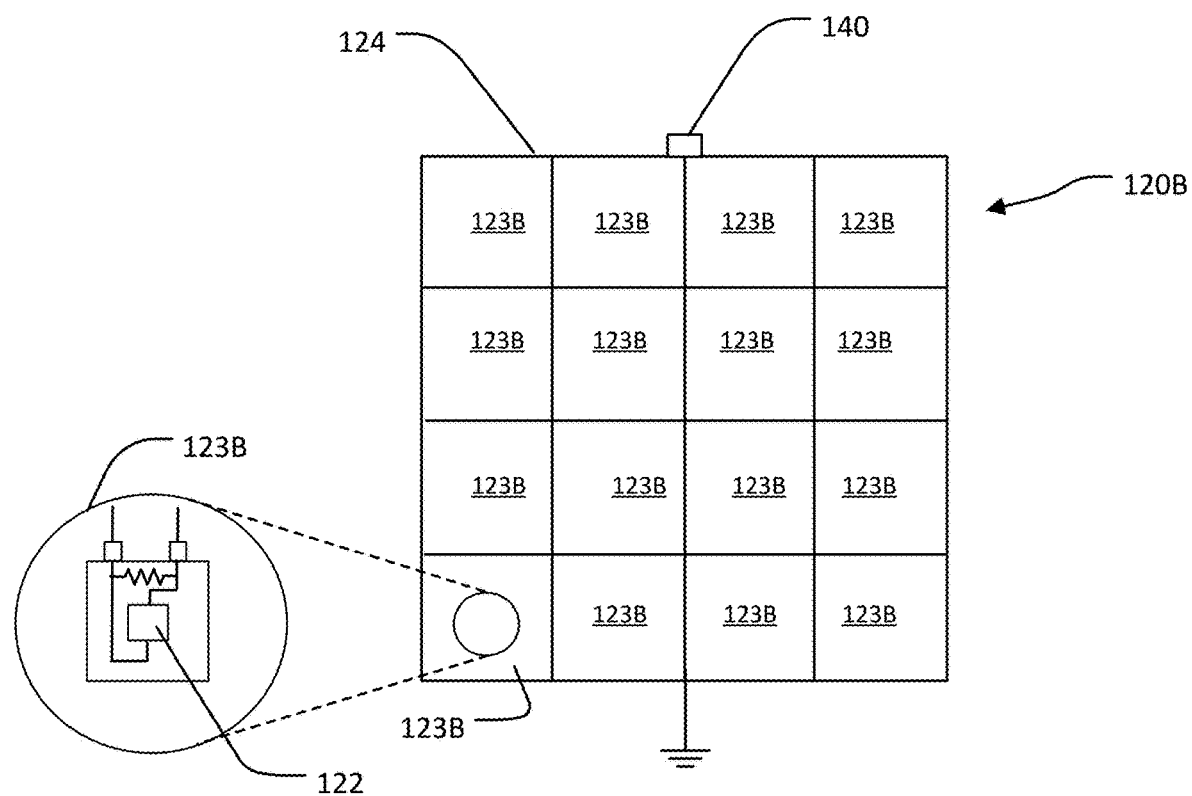
FIG. 1B is a block diagram of an example of a capacitor bank.

Referring also to FIG. 1B, the capacitor 120 may be a capacitor bank 120B. FIG. 1B is a block diagram of the capacitor bank 120B. The capacitor bank 120B includes a plurality of capacitors 123B, each of which includes at least one of the capacitive devices 122. In examples in which the capacitor 123B includes more than one capacitive device 122, the capacitive devices 122 may be connected in series or in parallel, or in a configuration that includes both series and parallel connections.

The capacitor bank 120B includes a large number (for example, hundreds or thousands) of capacitors 123B that are arranged in a fixed spatial relationship to each other. The fixed spatial relationship may be referred to as the geometry of the capacitor bank 120B. The capacitors 123B may be connected in series or in parallel, or in a configuration that includes both parallel and series connections. The capacitor bank 120B may be grounded or ungrounded. The capacitors 123B may be arranged such that the capacitor bank 120B is in a grounded wye, ungrounded wye, or delta configuration.

Figure 2C:
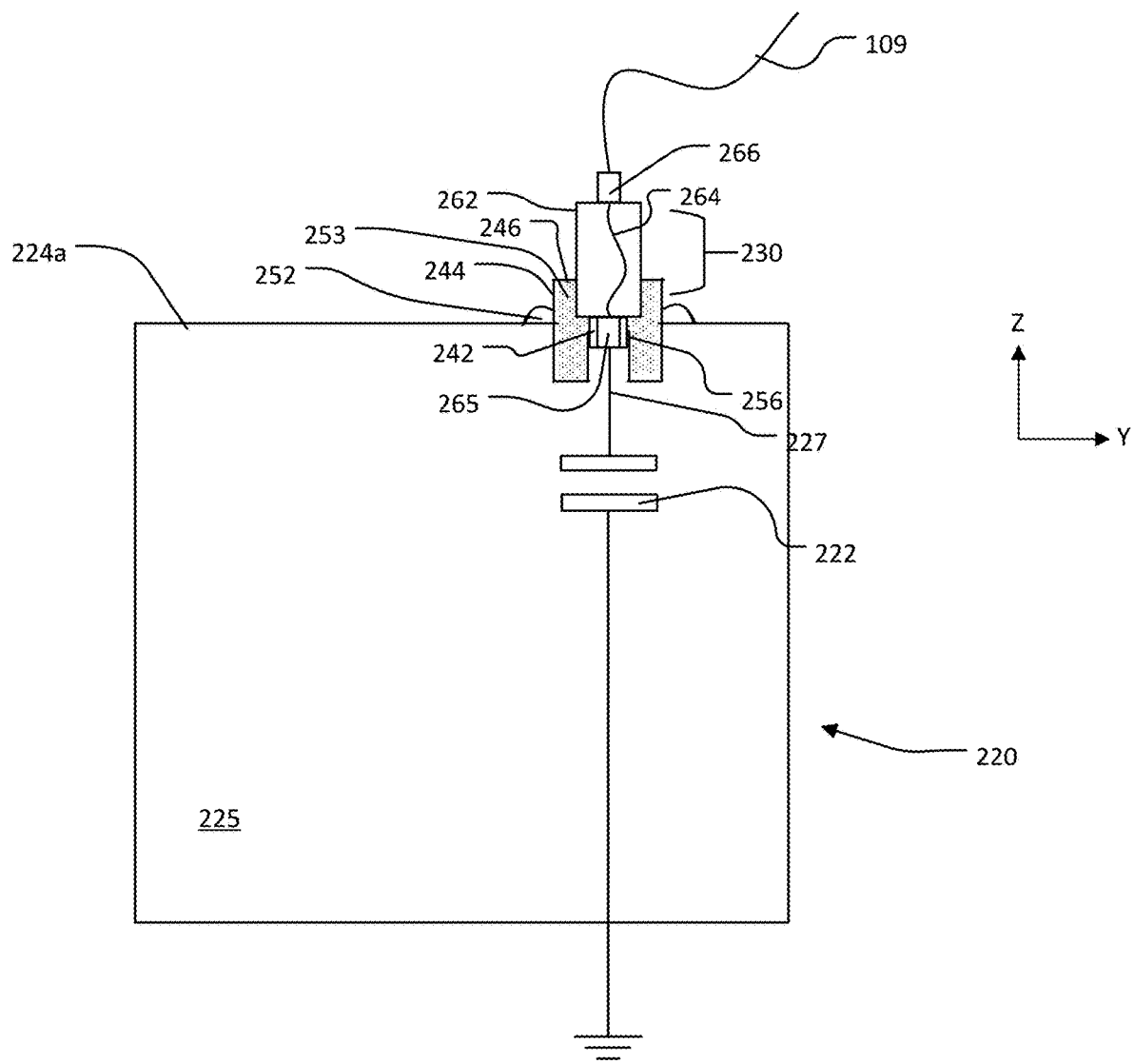
FIG. 2C shows a cross-sectional view of the capacitor, the adaptor, and the fuse of FIG. 2A in the Y-Z plane after these elements are connected to each other.

Referring to FIGS. 2A-2C, a capacitor 220, an adaptor 240, and a fuse 260 are shown. When connected, the adaptor 240 and the fuse 260 form an insulating bushing 230 for the capacitor 220. The capacitor 220 is an example of an implementation of the capacitor 120, and the adaptor 240 is an example of an implementation of the adaptor 140. The capacitor 220, the adaptor 240, and the fuse 260 may be used in the electrical power transmission and distribution network 101 (FIG. 1A).

FIG. 2A is a perspective exploded view of the capacitor 220, the adaptor 240, and the fuse 260. FIG. 2A shows the capacitor 220, the adaptor 240, and the fuse 260 prior to connecting any of these elements to each other. FIG. 2B is a cross-sectional view of the adaptor 240 in the X-Y plane taken along the line 2B-2B' of FIG. 2A. FIG. 2C shows a cross-sectional view of the capacitor 220, the adaptor 240, and the fuse 260 in the Y-Z plane after these elements are connected to each other.

The capacitor 220 includes at least one capacitive device 222 (FIG. 2C) enclosed in a structure 224. The capacitive device 222 is similar to the capacitive device 122 discussed with respect to FIG. 1A. The structure 224 is made from a rugged material, and may be made from a metallic material. For example, the structure 224 may be steel, stainless steel, a metal alloy, or another rugged metallic material. Non-metallic materials that are durable also may be used for the structure 224.

In the example of FIG. 2A, the structure 224 is shown as a parallelepiped (a body with six walls, with each wall being a parallelogram), with three of the six walls of the structure 224 labeled: walls 224a, 224b, and 224c. Each of the three walls 224a, 224b, and 224c has a corresponding identically shaped wall that is on an opposite side of the structure 224. The structure 224 may have other shapes. However, regardless of the shape of the structure 224, the structure 224 forms a sealed interior 225 (FIG. 2C) in which the capacitive device 222 is held. Additionally, the interior 225 of the structure 224 may contain a dielectric fluid, and the capacitive device 222 may be immersed in the dielectric fluid. The structure 224 is sealed in a manner that prevents air and other gasses and fluids from entering or leaving the interior 225. For example, the structure 224 may be hermetically sealed.

The fuse 260 includes an insulating fuse housing 262 that extends from a first end cap 265 to a second end cap 266. The insulating fuse housing 262 may be any type of electrically insulating material such as, for example, glass, ceramic, resin, or a polymer material. The insulating fuse housing 262 may include skirts (not shown) that extend radially outward from the fuse 260 and serve to increase the creepage distance of the insulating fuse housing 262. The insulating fuse housing 262 defines an interior space that contains a fusible element 264. The fusible element 264 is illustrated with a dashed line in FIG. 2A because it is inside of the insulating fuse housing 262.

The first and second end caps 265, 266 are made from an electrically conductive material, such as a metallic material. The fusible element 264 is electrically connected to the first end cap 265 and the second end cap 266. Thus, connecting either of the end caps 265, 266 to an external element also connects the fusible element 264 to that external element. The first end cap 266 has geometric features 267 on an exterior surface. The geometric features 267 may be, for example, threads. The fuse 260 may be a current-limiting fuse such as the X-LIMITER full-range current-limiting fuse available from the Eaton Corporation of Cleveland, Ohio.

Figure 4A:
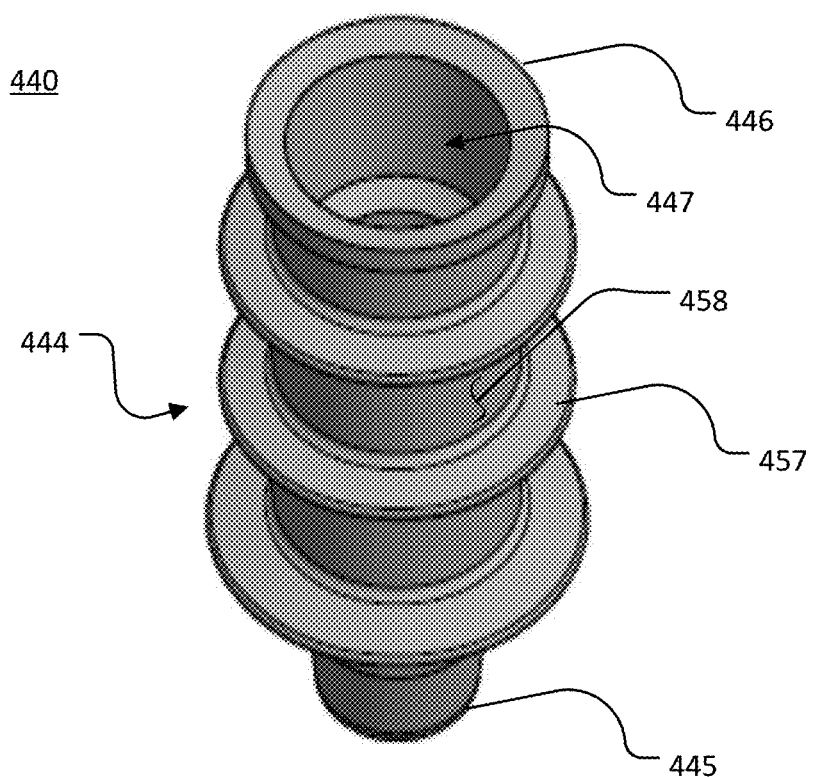
FIGS. 4A and 4B are perspective views of another example adaptor.
Figure 4B:
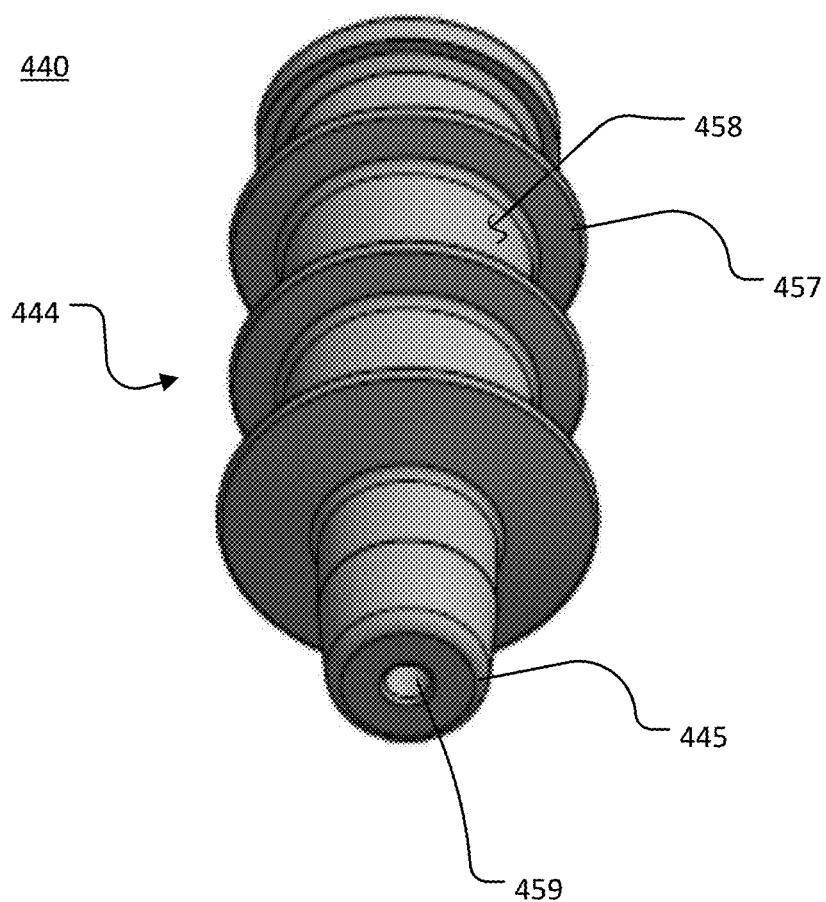
Figure 4C:
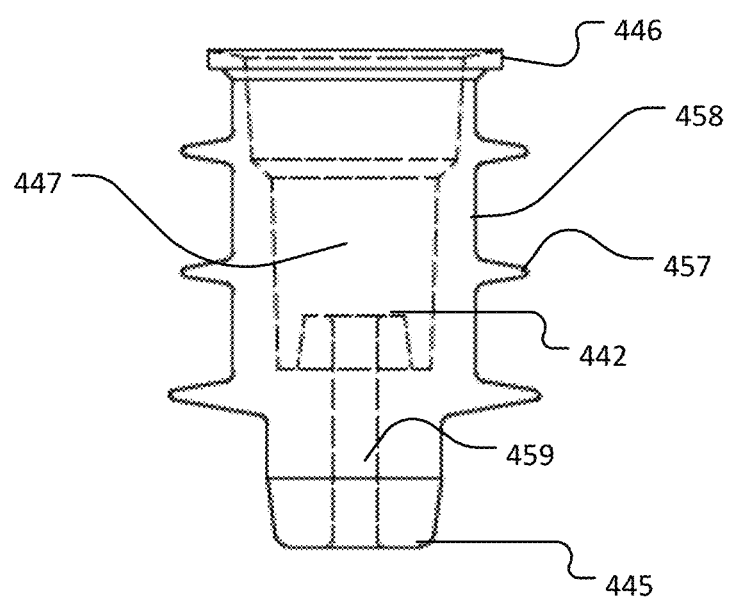
FIG. 4C is a side view of the adaptor of FIGS. 4A and 4B.

The adaptor 240 includes an adaptor body 244. The adaptor body 244 is made from an electrically insulating material, such as porcelain or another ceramic, glass, or a polymer material (for example, cycloaliphatic epoxy). The adaptor body 244 may include skirts that extend radially outward from the body 244 and serve to increase the creepage distance of the adaptor body 244. FIGS. 4A-4C show an example of an adaptor body 444 that includes skirts.

The adaptor body 244 extends from a first end 245 to a second end 246. The adaptor body 244 defines an interior space 247. Within the interior space 247 is a connection interface 242. The connection interface 242 is illustrated with dashed lines in FIG. 2A to indicate that it is inside of the adaptor body 244. The connection interface 242 is an electrically conductive material. For example, the connection interface 242 may be made from a metallic material, such as brass.

The connection interface 242 has a first side 248 (FIG. 2B) and a second side 249 (FIG. 2B). The first side 248 faces the interior space 247. The first side 248 includes geometric features 251 (FIG. 2A) that allow the connection interface 242 to connect to the geometric features 267 on the fuse 260. The geometric features 251 may be, for example, threads that interlock with corresponding threads on the fuse 260. The second side 249 of the connection interface 242 is sealed to an inside surface 250 of the adaptor body 244 with a seal 256. The seal 256 is illustrated as a shaded ring in FIG. 2B. The second side 249 may be hermetically sealed to the inside surface 250 with any compound that is capable of sealing an electrically conductive material to an electrically insulating material. For example, the seal 256 may be formed from an epoxy resin compound, such as, a component that includes a phenol novolac epoxy, a bisphenol A epoxy, or a combination thereof, and a curing agent.

In the example of FIG. 2A, the capacitor 220, the adaptor 240, and the fuse 260 connect to each other along the Z direction. The capacitor 220 includes an opening 226 that passes through the wall 224a and into the interior 225. The first end 245 of the adaptor 240 is inserted into the opening 226. A seal 252 (FIG. 2C) is formed between the adaptor body 244 and the wall 224a. The seal 252 may be formed from any material capable of sealing the material of the adaptor body 244 to the material of the wall 224a. For example, the seal 252 may be formed from an epoxy resin, and the material used to form the seal 252 may be the same as the material used to seal the second side 249 of the connection interface 242 to the inside surface 250 of the adaptor body 244. In another example, the seal 252 may be formed with soldering techniques. In yet another example, the seal 252 may be formed by welding a stainless steel flange (not shown) on the adaptor body 244 to the wall 244a.

The fuse 260 is inserted through the second end 246 of adaptor body 244 and into the interior space 247. It is not required that the entire fuse 260 be inserted into the adaptor 240. Instead, a portion of the fuse 260 may be inserted into the adaptor 240. For example, in some implementations, only the first end cap 265 is inserted into the adaptor 240. The geometric features 267 on the fuse 260 are connected to the geometric features 251 on the adaptor 240 to mechanically and electrically connect the adaptor 240 and the fuse 260, with the features 251 and the features 267 being in physical contact. The geometric features 251, 267 are configured to also allow the fuse 260 to be disconnected from the connection interface 242 through intentional action of an operator and without the act of intentional disconnection causing damage to the connection interface 242. This allows the fuse 260 to be replaced without replacing the adaptor 240 and the capacitor 220.

Thus, the geometric features 251, 267 are features that provide a strong enough connection to hold the fuse 260 to the connection interface 242 during operational use, but also allow the fuse 260 to be intentionally removed and replaced. For example, the geometric features 251, 267 may be threads sized and arranged to interlock with each other. In these implementations, the fuse 260 is attached to the adaptor 240 by screwing the first end cap 265 into the connection interface 242, and the fuse 260 may be intentionally removed by unscrewing the first end cap 265 from the connection interface 242.

The end cap 265 and the features 251, 267 are electrically conductive, and the fusible element 264 is electrically connected to the end caps 265, 266. Thus, bringing the features 251 and 267 into physical contact with each other also electrically connects the fusible element 264 to the connection interface 242. The connection interface 242 is electrically connected to the capacitive device 222 via a conduction path 227. As such, connecting the fuse 260 to the adaptor 240 also electrically connects the fuse 260 to the capacitor device or devices 222 that are within the structure 224. Furthermore, because the connection interface 242 is sealed to the inside surface 250 of the adaptor 240, and the adaptor 240 is sealed to the wall 224a at the seal 252, the interior space 225 of the capacitor 220 remains sealed even if the fuse 260 is intentionally removed for replacement.

When the fuse 260 and the adaptor 240 are connected and form the insulating bushing 230, a portion of the interior space 247 may remain unoccupied by the fuse 260. This portion forms a fluid-filled void in the adaptor 240. For example, the void may be an air-filled void. The relative portion of the void to the interior space 247 depends on the shape and size of the interior space 247 relative to the shape and size of the fuse 260.

During a fault event or in the course of normal operation (for example, during an energization transient), the presence of air in the insulating bushing 230 may cause an arc to form at the adaptor 240 instead of at the second end 266 of the fuse 260. Thus, in some implementations, the interior space 247 includes a filler material 253. The filler material 253 is illustrated in FIG. 2C with gray shading. The filler material 253 is inserted into the interior space 247 and fills any voids that are in the interior space 247. Thus, the filler material 253 displaces the air in the interior space 247, resulting in the interior space 247 being substantially air-free when the fuse 260 is connected to the adaptor 240. The filler material 253 may be inserted into the interior space 247 after the fuse 260 is connected to the adaptor 240, or before the fuse 260 is connected to the adaptor 240. In implementations in which the filler material 253 is inserted into the interior space 247 before the fuse 260 is connected to the connection interface 242, the connection interface 242 is covered or otherwise protected such that the filler material 253 does not contact the connection interface 242.

Figure 3:
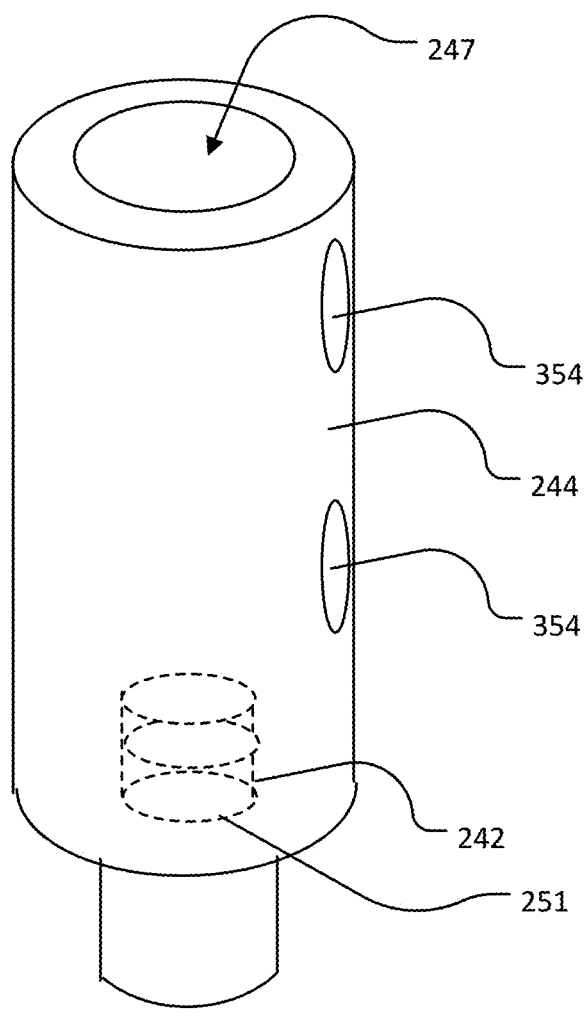
FIG. 3 is a perspective view of another example adaptor.

The filler material 253 may be inserted through the second end 246 of the adaptor body 244. In some implementations, the adaptor body 244 includes ports through which the filler material 253 is inserted. FIG. 3 is a perspective view of an adaptor 340 that includes ports 354 through which the filler material 253 may be inserted. The adaptor 340 is an example of another implementation of the adaptor 240. The adaptor 340 is identical to the adaptor 240, except the adaptor 340 includes the ports 354, which pass through the adaptor body 244. The ports 354 allow access to the interior space 247 of the adaptor body 244 from an exterior of the adaptor body 244.

The filler material 253 may be any type of non-conductive material that has a relatively low viscosity. The relatively low viscosity of the filler material 253 allows the filler material 253 to flow throughout the interior space 247 and displace substantially all of the air in the interior space 247. Moreover, the filler material 253 has DC and AC breakdown characteristics that allow the filler material 253 to withstand the voltages to which the insulating bushing 230 is exposed. Furthermore, the filler material 253 is minimally adhesive to the adaptor body 244, and has a life expectancy that is sufficient to last for the lifetime of the adaptor body 244. The filler material 253 is also selected to have a coefficient of expansion and contraction after curing that allows the filler material 253 to substantially fill the interior space 247 even after the filler material 253 is cured. The filler material 253 may be, for example, a one-part silicone or a two-part silicone. The filler material 253 may be, for example, a room-temperature-vulcanizing (RTV) silicone compound. In implementations in which the filler material 253 is not cured, the openings of the adaptor body 244 are plugged after the filler material 253 is inserted.

Referring to FIGS. 4A-4C, an adaptor 440 is shown. The adaptor 440 is another example of an implementation of the adaptor 140 (FIG. 1A). The adaptor 440 may be used in the electrical power transmission and distribution network 101 (FIG. 1A). The adaptor 440 may be used with the capacitor 220 and/or the fuse 260 (FIGS. 2A and 2C). The adaptor 440 may be used with the fuse 260 or the fuse 160 to form an insulating bushing for a capacitor. Moreover, the adaptor 440 may be mounted to an open-air rack or on a pole in a substation.

FIG. 4A is a perspective view from a second end 446 of the adaptor 440. FIG. 4B is a perspective view from a first end 445 of the adaptor 440. FIG. 4C is a side view of the adaptor 440 with elements that are inside the adaptor 440 depicted with dashed lines.

The adaptor 440 includes an adaptor body 444 that extends from the first end 445 to the second end 446. The adaptor body 444 defines an interior space 447. The adaptor body 444 is made of an electrically insulating material, such as, for example, ceramic, a polymer, a resin, and/or glass. Skirts 457 extend radially outward from an exterior surface 458 of the adaptor body 444. The skirts 457 increase the creepage distance of the adaptor body 444. The adaptor body 444 includes three skirts 457. However, more or fewer skirts may be used in other implementations. Furthermore, in some implementations, no skirts are used.

The adaptor body 444 includes a connection interface 442 (FIG. 4C) in the interior space 447. The connection interface 442 is configured to connect to a fuse (such as the fuse 260 of FIGS. 2A and 2C). A passageway 459 passes from the connection interface 442 to the exterior of the adaptor body 444, and is open at the first end 445. The passageway 459 allows the connection interface 442 to connect to a capacitive device that is inside of a structure (such as the capacitive device 222 inside of the structure 224 of FIG. 2C).

Figure 5:
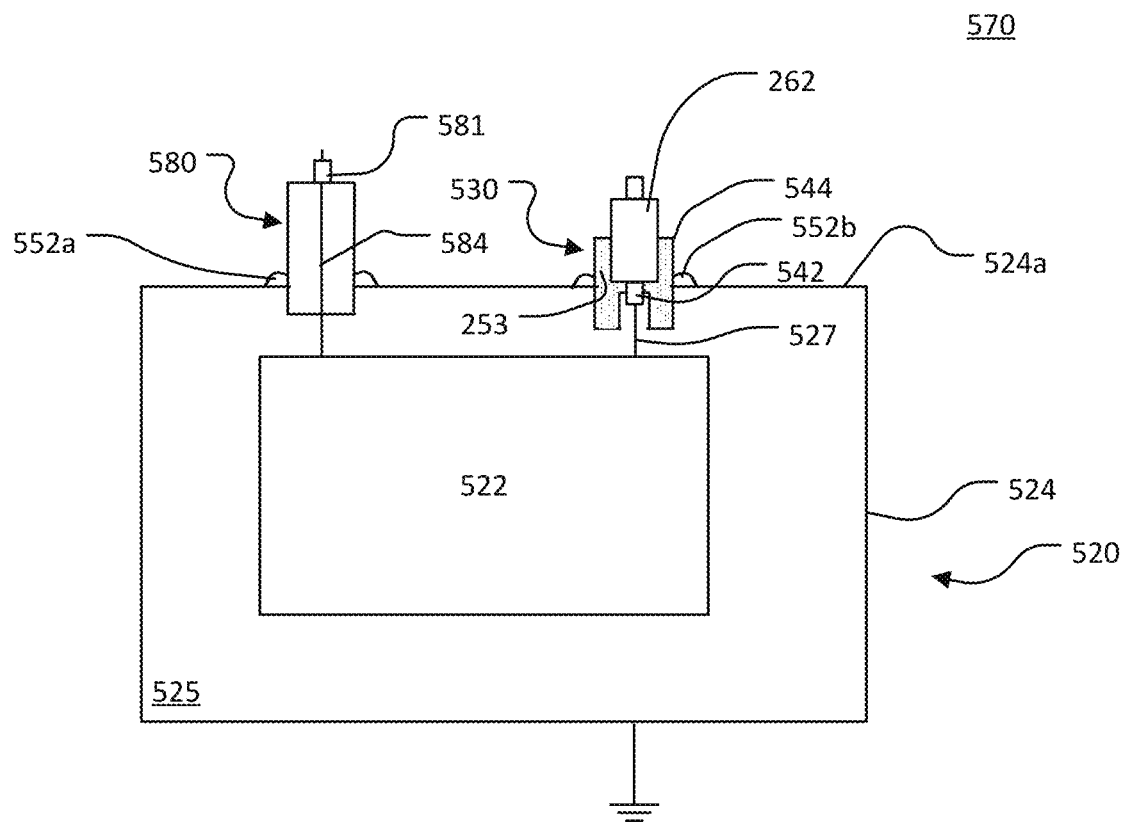
FIG. 5 is a side block diagram of an example capacitor unit.

Referring to FIG. 5, a side block diagram of a capacitor unit 570 is shown. The capacitor unit 570 may be installed with other capacitor units in a housing, an open air rack, or a substation bank. A substation bank may house, for example, hundreds of capacitor units. Within a substation bank, capacitor units such as the capacitor unit 570 are mounted on mounting structures within the substation. The capacitor unit 570 is an example of a capacitor unit that includes more than one insulated bushing. The capacitor unit 570 illustrated in FIG. 5 includes two insulating bushings and is a "double bushing" or "two bushing" capacitor unit.

The capacitor unit 570 includes a capacitor 520, which encloses one or more capacitor devices 522 in an interior 525 of a sealed structure 524. The structure 524 may be, for example, a metal enclosure or an enclosure made from any other rugged material. The capacitor unit 570 also includes insulating bushings 580 and 530. The insulating bushings 580 and 530 extend outward from a top wall 524a of the structure 524. The insulating bushing 580 is sealed to the top wall 524a of the structure 524 with a seal 552a, and the insulating bushing 530 is sealed to the top wall 524a with a seal 552b. The seals 552a, 552b are fluid-tight seals that prevent air and other fluids from entering or leaving the interior 525. The seals 552a, 552b may be made from, for example, an epoxy resin, soldering, or welding. The capacitor devices 522 are electrically connected to an electrical power system (such as the electrical power transmission and distribution network 101 of FIG. 1A) through the insulating bushings 580 and 530.

The insulating bushing 580 is a traditional insulating bushing that includes a terminal 581 and a passageway (not shown) through which a conductor 584 passes. The terminal 581 is made from an electrically conductive material, such as a metal. The conductor 584 is electrically connected to the capacitor devices 522 and to the terminal 581. The terminal 581 is sealed to the insulating bushing 580 such that the interior 525 remains sealed despite the conductor 584 passing from the terminal 581 to the interior 525. The traditional bushing 580 may be made from any electrically insulating material, such as, for example, glass, ceramic, a dielectric, and/or a resin. The traditional bushing 580 may be a single-piece of molded insulating material.

The insulating bushing 530 in implemented in a different manner than the traditional bushing 580. In particular, the insulating bushing 530 is similar to the bushing 130 (FIG. 1A) and the bushing 230 (FIG. 2C). The insulating bushing 530 is formed from an adaptor body 544 and the insulating fuse housing 262 of the fuse 260. The adaptor body 544 is similar to the adaptor body 244 or the adaptor body 444 discussed above. The fuse 260 electrically connects to the capacitive devices 522 through a connection interface 542 and a lead 527, similar to discussed with respect to FIG. 2C. The fuse 260 may be intentionally removed from the connection interface 542 to replace the fuse 260.

Other implementations are within the scope of the claims. For example, the capacitors 120 and 220 are shown as having a single insulating bushing 130 and 230, respectively. In other implementations, the capacitors 120 and 220 may have more than one insulating bushing. The additional insulating bushings may be bushings similar to the bushings 130 and 230, or one or more of the additional insulating bushing may be traditional bushings similar to the bushing 580 of FIG. 5. The adaptors 240, 340, and 440 are illustrated as having a substantially circular cross-section. However, other configurations and shapes may be used in other implementations.

What is claimed is:

1. A system comprising:
   a capacitor comprising:
      a structure, and
      one or more capacitive devices at the structure; and
   an electrically insulating bushing comprising:
      a fuse comprising:
         a fuse body comprising a fuse housing, a first fuse end, and a second fuse end, the fuse housing extending from the first fuse end to the second fuse end and defining an interior space, and
         a fusible element in the interior space, the fusible element electrically connected to the first fuse end and the second fuse end; and
      an adaptor comprising:
         an adaptor body extending from a first adaptor end to a second adaptor end, the adaptor body comprising an inner surface that defines an interior space, the adaptor body hermetically sealed to the structure and the second adaptor end configured to receive the first fuse end, and
         an adaptor connection interface on the inner surface of the adaptor body, wherein the adaptor connection interface comprises an electrically conductive material, and the first fuse end is removably connected to the adaptor at the adaptor connection interface.

2. The system of claim 1, wherein the adaptor connection interface comprises a metallic material on the inner surface of the adaptor body, the metallic material on the inner surface of the adaptor body being configured to make physical contact with the first fuse end.

3. The system of claim 1, wherein the adaptor connection interface comprises metallic adaptor threads on a first side, a second side of the adaptor connection interface is sealed to the inner surface of the adaptor body, and the first fuse end comprises metallic fuse threads that are configured to interlock with the adaptor threads to removably connect the first fuse end to the adaptor connection interface.

4. The system of claim 1, wherein the adaptor body comprises a ceramic material.

5. The system of claim 1, wherein the adaptor body comprises a polymer material.

6. The system of claim 1, wherein the adaptor body comprises a plurality of skirts, each skirt extending radially from an exterior surface of the adaptor body.

7. The system of claim 1, further comprising a filler material in the adaptor body, the filler material and portions of the fuse that are received in the adaptor body substantially filling the adaptor body.

8. The system of claim 7, wherein the adaptor body further comprises one or more ports configured to allow insertion of the filler material.

9. The system of claim 7, wherein the filler material comprises a material that is not electrically conductive and that increases a withstand voltage of the electrically insulating bushing.

10. The system of claim 1, wherein the structure comprises a housing that encloses the one or more capacitive devices.

11. The system of claim 1, wherein the one or more capacitive devices are in an interior of the structure.

12. A system comprising:
   an adaptor configured to be hermetically sealed to a capacitor device structure, the adaptor comprising an adaptor body of an insulating material, the adaptor body comprising a sidewall that extends from the capacitor device structure and defines an interior space, the sidewall comprising an exterior surface and an interior surface and the adaptor body further comprising an electrically conductive adaptor interface in the interior space and adhered to the interior surface, wherein
      the electrically conductive adaptor interface is configured to connect to an exterior body of a fuse that is external to and separate from the capacitor device structure to mount the fuse to the adaptor and, when the fuse is connected to the electrically conductive adaptor interface, the fuse and the adaptor form an insulating bushing for the capacitor device structure.

13. The system of claim 12, wherein the adaptor further comprises a filler material, and, when the fuse is connected to the electrically conductive adaptor interface, the interior space is filled with the fuse and the filler material such that no air is in the interior space.

14. The system of claim 13, wherein the insulating material comprises a polymer.

15. The system of claim 14, wherein the electrically conductive adaptor interface comprises threads configured to interlock with corresponding threads on the exterior body of the fuse.

16. The system of claim 13, wherein the filler material a material that is not electrically conductive and that increases a withstand voltage of the insulating bushing.

17. The system of claim 12, wherein the electrically conductive adaptor interface comprises a metallic material.

18. The system of claim 12, wherein the exterior body of the fuse comprises a first end cap, a second end cap, and a housing that extends between the first end cap and the second end cap; and the electrically conductive adaptor interface is configured to attach to an exterior of the first end cap.

19. The system of claim 12, further comprising:
the capacitor device structure; and
at least one capacitive device in the capacitor device structure, wherein, when the adaptor is hermetically sealed to the capacitor device structure, the electrically conductive adaptor interface is electrically connected to the at least one capacitive device.

20. A capacitor comprising:
a structure;
a plurality of capacitive devices at the structure;
a plurality of electrically insulating bushings extending outward from the structure, each of the plurality of electrically insulating bushings hermetically sealed to the structure, the plurality of electrically insulating bushings comprising at least a first electrically insulating bushing and a second electrically insulating bushing, wherein
the first electrically insulating bushing comprises:
a single-piece body formed of an electrically insulating material, the single-piece body extending from a first end of the single-piece body to a second end of the single-piece body, the first end of the single-piece body passing through a first opening in the structure and an exterior surface of the single-piece body being hermetically sealed to the structure such that the first opening is hermetically sealed; and
the second electrically insulating bushing comprises:
an electrically insulating adaptor body extending from a first end to a second end, the adaptor body comprising an electrically insulating material and an electrically conductive connection interface, the first end of the adaptor body passing through a second opening in the structure and an exterior surface of the adaptor body being hermetically sealed to the structure such that the second opening is hermetically sealed, and
a fuse comprising a fuse housing, a first end cap, a second end cap, and a fusible element in the fuse housing, wherein the electrically conductive connection interface is configured to hold an exterior the first end cap of the fuse to the adaptor body and to electrically connect the fusible element to at least one the plurality of capacitive devices.

21. The capacitor of claim 20, wherein the first electrically insulating bushing further comprises a first fusible element in the single-piece body, wherein the first fusible element is permanently installed in the single-piece body and the first fusible element not configured for replacement; and
wherein the electrically conductive connection interface is configured to allow the fuse to be removed from the electrically insulating adaptor body and replaced.

22. A system comprising:
a capacitor comprising:
a structure, and
one or more capacitive devices at the structure; and
an electrically insulating bushing comprising:
a fuse comprising:
a fuse body comprising a fuse housing, a first fuse end, and a second fuse end, the fuse housing extending from the first fuse end to the second fuse end and defining an interior space, and
a fusible element in the interior space, the fusible element electrically connected to the first fuse end and the second fuse end; and
an adaptor comprising:
an adaptor body extending from a first adaptor end to a second adaptor end, the adaptor body hermetically sealed to the structure and the second adaptor end configured to receive the first fuse end, and
an adaptor connection interface in the adaptor body, wherein the first fuse end is removably connected to the adaptor at the adaptor connection interface, and, wherein
the adaptor connection interface comprises metallic adaptor threads on a first side, a second side of the adaptor connection interface is sealed to an inner surface of the adaptor body, and the first fuse end comprises metallic fuse threads that are configured to interlock with the adaptor threads to removably connect the first fuse end to the adaptor connection interface.

23. A system comprising:
a capacitor device configured to be received at a capacitor device structure; and
an adaptor configured to be hermetically sealed to the capacitor device structure, the adaptor comprising an adaptor body of an insulating material, the insulating material comprising a polymer, the adaptor body comprising a sidewall that extends from the capacitor device structure and defines an interior space, the sidewall comprising an exterior surface and an interior surface, and the adaptor body further comprising an electrically conductive adaptor interface in the interior space and adhered to the interior surface, wherein
the electrically conductive adaptor interface is configured to connect to a fuse that is external to and separate from the capacitor device structure to mount the fuse to the adaptor and,
when the fuse is connected to the electrically conductive adaptor interface, the fuse and the adaptor form an insulating bushing for the capacitor device, and wherein
the adaptor further comprises a filler material, and, when the fuse is connected to the electrically conductive adaptor interface, the interior space is filled with the fuse and the filler material such that no air is in the interior space, and the electrically conductive adaptor interface comprises threads configured to interlock with corresponding threads on an exterior of the fuse.

\* \* \* \* \*